June 4, 1968  J. D. KELLER  3,386,331
APPARATUS FOR ABSORPTION SPECTROCHEMICAL ANALYSIS
Filed March 24, 1964  2 Sheets-Sheet 1
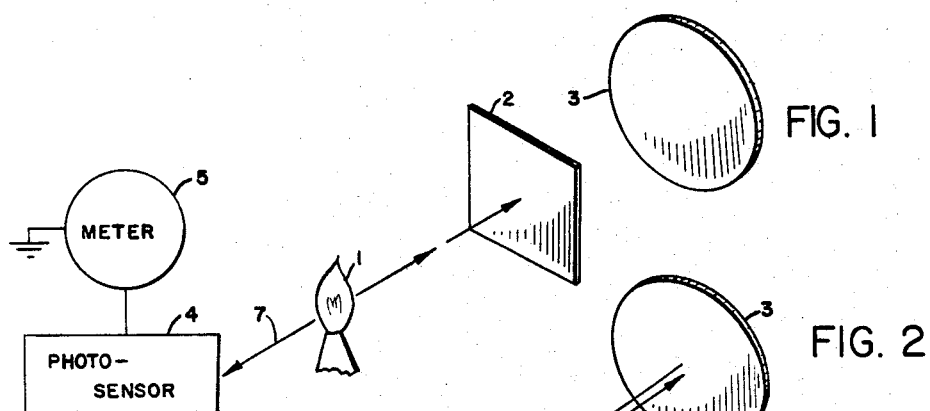
FIG. 1
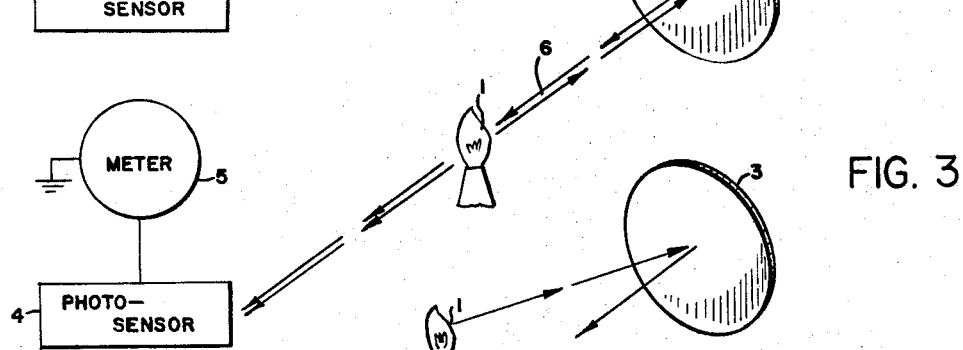
FIG. 2
FIG. 3
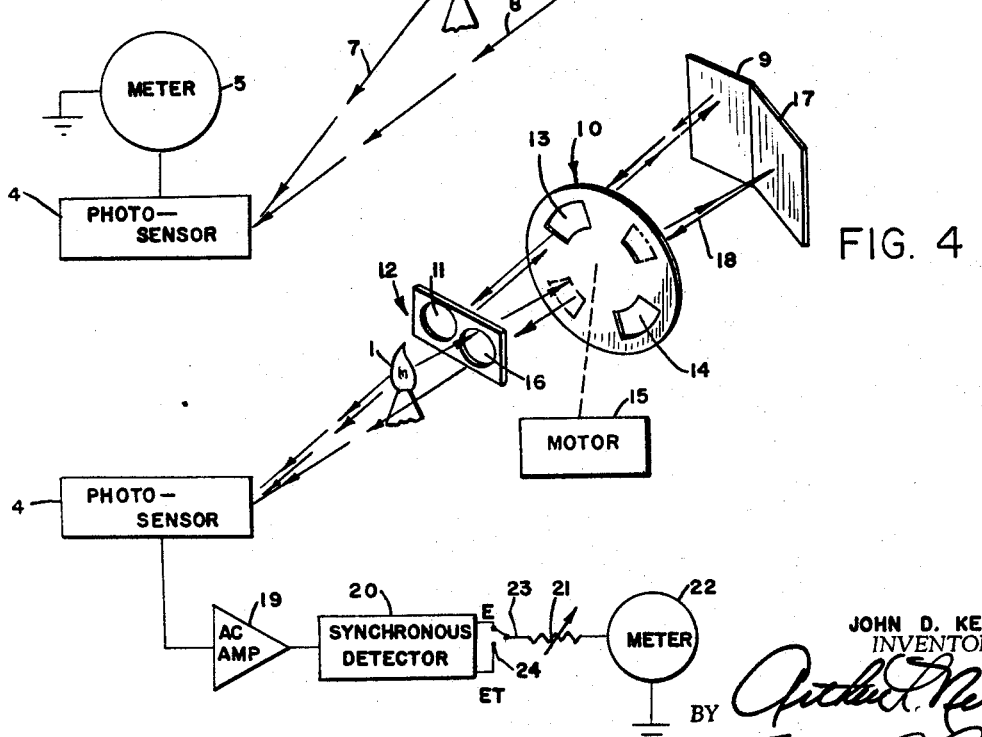
FIG. 4
JOHN D. KELLER
INVENTOR.
BY
ATTORNEYS

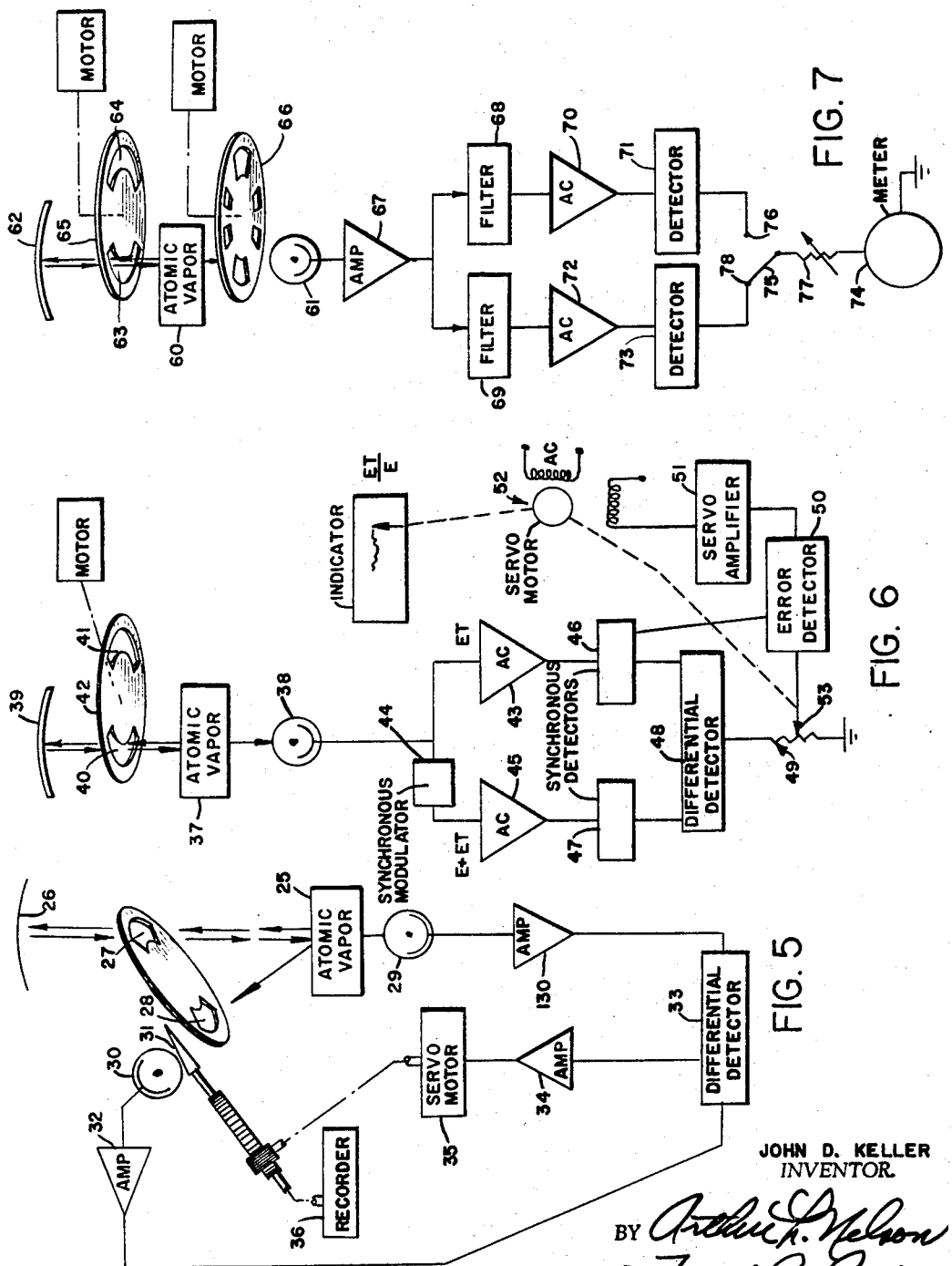

United States Patent Office 3,386,331
Patented June 4, 1968

3,386,331
**APPARATUS FOR ABSORPTION SPECTRO-
CHEMICAL ANALYSIS**
John D. Keller, Greece, N.Y., assignor to Bausch &
Lomb Incorporated, Rochester, N.Y., a corporation of New York
Filed Mar. 24, 1964, Ser. No. 354,395
7 Claims. (Cl. 88—14)

ABSTRACT OF THE DISCLOSURE

A photoelectric apparatus for spectrochemical analysis wherein samples to be analyzed are inserted into a flame to emit a predetermined radiation spectral line characteristic and absorb the same. Radiation from the flame is directed to a photosensor and also redirected back through the flame to the photosensor. The signals generated by the photosensor are monitored to determine the amount of redirected radiation absorbed by the sample in the flame.

---

Various methods of spectrochemical analysis have been used in which a spectral line of an atom provides a means of determining the concentration or the presence of an element. The photosensor senses an excited atom or an atom that is in the transition state between the excited state and the ground state. A source of atomic vapor may be used to emit radiation. The source also absorbs radiation if the beam is directed through the source. Accordingly this invention is intended to provide an atomic vapor radiating a beam of radiation which is retro-reflected through the atomic vapor to provide a means of absorbing radiation. The measure of absorption provides a means of sensing the presence or the concentration of an atom in the source of radiation such as atomic vapor.

It is an object of this invention to provide a means and a method for spectrochemically analyzing the concentration of an element or of an isotope of the element in a substance by producing a beam of radiation by atomic vapor and redirecting the beam of radiation through the radiation source thereby the atomic vapor operates as the emitting and absorbing medium.

It is another object of this invention to provide a means of spectrochemically analyzing an element or an isotope of the element by generating a beam of radiation by an atomic vapor source and absorbing radiation of said beam by said source and comparing transmittance to source intensities.

It is a further object of this invention to provide a means and a method of spectrochemical analysis whereby the source of the beam of radiation operates as an absorbing medium and the intensities of the transmitted and retro-reflected radiation is compared.

The objects of this invention are accomplished by providing a source of atomic vapor which emits radiation. The beam of radiation emitted from the source of atomic vapor is redirected through the atomic vapor which operates as an absorbing medium. The ratio of the beam transmitted through the source of atomic vapor to the beam initially radiated from the atomic vapor is compared and the ratio provides a means of measuring the concentration of an atom or an isotope of the atom in a substance. The atomic vapor operates as a radiating source and also an absorbing medium. A photosensor then senses the intensities of the beam and generates electrical signals in response to the intensities of the beam transmitted through the source and the beam initially radiated from the source of atomic vapor. Various means may be provided for sensing the relationship of intensities. The variation in intensities of the transmitted and original radiation may be recorded to provide a measure and a permanent record of the presence of an element or an isotope of the element and the concentration of the isotope. The electrical circuits may include AC or DC amplifiers operating an attenuator control to provide the reading. Another means of providing a measure of the intensities would be a synchronized modulator and detector detecting the difference in pulse heights of the two beams and then provide a null balancing servo system to record the ratio. Still another means of providing a measure of intensities on the light beams and then provide a meter to directly read the ratio of intensities of these beams.

The preferred embodiment of this invention is described in the following paragraphs and illustrated in the attached drawings.

FIG. 1 illustrates a means of measuring the intensity of a beam emitted by a source of atomic vapor.

FIG. 2 illustrates a means for measuring the intensity of a beam of light including the original radiated beam and the retro-reflected beam.

FIG. 3 illustrates a means of measuring the double intensity of a beam of radiation emitted from a source of atomic vapor.

FIG. 4 illustrates a means of modulating a beam of light in a manner whereby the ratio of the transmittance to the original beam is determined.

FIG. 5 illustrates a means of modulating a light beam and an attenuator servo system for recording intensities of the reflected and the attenuated beam of light.

FIG. 6 illustrates a means of modulating a light beam to provide a ratio recording servo system for measuring intensities.

FIG. 7 illustrates a means for modulating the light beam at more than one frequency to provide more than one electrical frequency which are amplified and detected to provide a measure of intensities.

Referring to the drawings, FIGS. 1, 2 and 3 illustrate an elementary means of measuring the radiation intensity from a source of atomic vapor and the intensity from retro-reflected beams of radiation. FIG. 1 illustrates an atomic vapor 1 which emits radiation which is blocked by the screen 2 from being directed on the mirror 3. A photosensor 4 receives radiation from the atomic vapor 1. The photosensor 4 generates a signal which is measured by the meter 5.

FIG. 2 illustrates an atomic vapor 1 radiating a beam of radiation 6 on the mirror 3. The screen 2 is removed so that the radiation is retro-reflected through the atomic vapor 1 and the photosensor 4 receives radiation of the intensity of the original beam plus the redirected transmitted beam which is transmitted through the vapor source 1. The meter 5 provides a measure of the combined intensities of the radiated beam and the transmitted beam.

FIG. 3 illustrates the atomic vapor 1 radiating a beam of radiation on the mirror 3 which is reflected onto the photosensor 4. The photosensor is irradiated by the radiated beam 7 and the reflected beam 8. By eliminating the effect of the radiated beam 7 which originates at the atomic vapor 1, the ratio intensities of the transmitted beam 6 which is retro-reflected through the atomic vapor and the reflected beam 8 can be determined.

FIG. 4 illustrates a means whereby this may be automatically accomplished. A beam of radiation from the atomic vapor 1 also irradiates the mirror 9 which is retro-reflected through the atomic vapor and impinges on the photosensor 4 when the disk 10 is positioned so that the light passes through the opening 11 in the mask 12 and either of the openings 13 or 14 of the disk 10. A second measurement of radiation intensity is also made when the motor 15 rotates the disk 10 sufficiently so that the opening 16 of the mask 12 is aligned with either of the openings 13 or 14 which permits radiation from the atomic vapor to radiate mirror 17. The beam 18 is retro-reflected by the mirror 17 but does not pass through the atomic vapor and the photosensor senses a beam intensity equal to the radiated beam and the retro-reflected beam 18. Two signals are generated which have magnitudes proportional to the respective beams. The radiated beam which is radiated directly from the atomic vapor to the photosensor generates a direct current signal. The AC amplifier 19 will not accept a direct current signal. The magnitude of the signals are then determined by the detector 20. For the purpose of illustration when the signal of the magnitude of radiation of the retro-reflected beam is impressed on the meter 22 the variable resistor 21 is adjusted to provide 100% deflection. As the switch 23 is positioned to contact the terminal 24 the meter reads the transmittance beam which is in percent of transmittance of radiation through the vapor source 1.

Referring to FIG. 5 an atomic vapor 25 radiates a beam of radiation on the mirror 26. When the openings 27 or 28 are aligned intermediate the atomic vapor 25 and the mirror 26 the beam is retro-reflected through the atomic vapor and the photosensor 29 receives radiation equal to the intensity of the radiated beam and the transmitted beam. Only the modulated signal generated by the photosensor 29 is amplified in the amplifier 130.

A second beam of radiation is directed through the openings 27 or 28 when they are aligned with the second photosensor 30. The second beam of radiation passes through the attenuator 31 and is sensed by the photosensor 30. The modulated electrical signal is amplified by the amplifier 32.

The difference in magnitude of the two signals is then detected by the difference detector 33 and amplified by the amplifier 34. The amplifier 34 operates a servo motor 35 which controls the movement of the attenuator 31 and simultaneously records a signal proportional to the difference of intensities of the transmitted beam and the attenuated beam through the recorder 36.

Referring to FIG. 6 the atomic vapor 37 radiates a beam of radiation on the photocell 38. A beam of radiation is also directed on the mirror 39 which is retro-reflected through the atomic vapor when either of the openings 40 or 41 in the chopper 42 is aligned intermediate the atomic vapor 37 and the mirror 39. Two electrical signals are generated by the photocell 38. The first signal is a direct current signal generated by a constant intensity of the radiating beam from the atomic vapor 37. The second signal is a modulated signal in response to the modulation of the chopper 42. The modulated beam passes directly into the AC amplifier 43 and is amplified. A synchronized modulator 44 is also connected to the output of the photocell 38 which is synchronized with the chopper 42 and applies a pulse signal having an amplitude responsive to the combined intensity of the radiated beam which generates a DC signal and the modulated signal responsive to the modulated light signal generated by the chopper 42. This electrical signal is then applied to the AC amplifier 45 where it is amplified. The output of the amplifiers 43 and 45 is then detected by synchronous detectors 46 and 47 respectively. A difference detector 48 detects the difference of the two signals and produces an output of a magnitude proportional to the magnitude of the radiated beam. This signal is applied to the potentiometer 49. The output of the synchronous detector 46 is also applied to an error detector 50. The output of the error detector 50 is applied to the amplifier 51 which is amplified and fed into the servo motor 52. The magnitude and the direction of the signal applied to the servo motor depends on the signal detected by the error detector 50 which drives the motor 52 driving the slider contact 53 on the potentiometer 49 to a neutral position while simultaneously recording a ratio of the transmitted to the initially radiated beam.

Referring to FIG. 7 another method and apparatus of spectrochemical analyzing is illustrated. The atomic vapor 60 radiates a beam of radiation on a photosensor 61 and also irradiates the mirror 62. When the openings 63 or 64 of the chopper 65 are aligned intermediate the atomic vapor 60 and the mirror 62 the chopper 65 generates a low frequency modulated light signal. The chopper 66 generates a high frequency radiation signal. The plurality of openings in the chopper 66 permits the radiation from the atomic vapor and the retro-reflected radiation transmitted through the atomic vapor to pass through to irradiate the photocell 61 at a high and low frequency. These alternating high and low frequency signals are amplified by the amplifier 67 and the filters 68 and 69 filter the output from the amplifier. For purposes of illustration the filter 68 passes the high frequency which is then applied to the amplifier 70 where it is amplified. The high frequency is detected in the detector 71. The low frequency is passed by the filter 69 and then applied to the amplifier 72 where it is amplified. The low frequency is then applied to the detector 73 where it is detected. The detected high frequency provides a measure of the initially radiated beam which indicates 100% transmittance on the meter 74 when the switch arm 75 is connected to the terminal 76. The meter may be adjusted by the variable resistor 77 to read 100% transmittance when the arm is connected to terminal 76. When the switch arm 75 is connected to the terminal 78 the meter directly reads transmittance in percentage.

The spectrochemical analysis will be described in the following paragraphs. An atomic vapor 1 is used to provide a source of radiation. A beam of radiation originating from the atomic vapor is retro-reflected through the atomic vapor where a portion of the radiation is absorbed. By using the same atomic vapor as the source of radiation and the absorbing medium effects of fluctuations in intensities are eliminated. The ratio between a retro-reflected transmitted beam to a retro-reflected beam may be measured directly to provide a ratio relationship, or a direct measure of the transmittance of the beam. The transmitted beam or the retro-reflected beam which irradiates the photosensor may be modulated to differentiate between the initial radiated beam and the transmitted or retro-reflected beam.

FIG. 4 illustrates a means of modulating the retro-reflected beam and the transmitted beam which irradiates a photosensor. The frequency of modulation for each of the beams is the same so that the amplifier 19 amplifies both beams. There is a phase differential, however, of the beams amplified which permit the synchronous detector 20 to detect the retro-reflected beam and the transmitted beam separately. The output responsive to either beam may be separately connected to the meter 27 to initially calibrate the meter and then measure percentage transmittance.

FIG. 5 illustrates a servo recording system whereby signals generated by the photosensors 29 and 30 are equalized by the attenuator 31. The difference detector 33 feeds into an amplifier 34 and a servo motor 35 to rebalance any unbalance in the optical beams. The system can read a measurement of the difference of the two beams.

FIG. 6 illustrates a modulating means and a synchronous modulating electrical device whereby AC and DC signals may be modulated and amplified in AC amplifiers and then detected at the separate channel outputs. A null balancing ratio recording servo system is operated in response to an error detector to record the ratio of intensities of the initially radiated beam and the transmitted beam or vice versa.

FIG. 7 illustrates the means for modulating a low and high frequency modulated light signal. These signals are amplified and then filtered and subsequently detected to provide a measure of transmittance or absorption relative to radiation of the atomic source.

The preferred embodiment of this invention has been illustrated and described of which other embodiments may be devised which would fall within the scope of the attached claims which define the invention.

I claim:
1. An apparatus for spectrochemically analyzing an element or an isotope of an element in a material comprising, means producing an atomic vapor emitting radiation having an atomic spectral line characteristic of an element or an isotope of the element, means receiving radiation from said means producing an atomic vapor for retro-reflecting the radiation through the atomic vapor and for bypassing radiation about said atomic vapor, means positioned for modulating the retro-reflected and bypassing radiation, a photosensor for sensing radiation transmitted through said atomic vapor and radiation bypassing said atomic vapor and generating electrical signals representative of the radiation transmitted through the atomic vapor and radiation bypassing the atomic vapor so that the degree of presence of an element or an isotope of an element can be determined.

2. Photoelectric apparatus comprising flame generating means for exciting a sample to be analyzed and causing said sample to emit and absorb at least one spectral line of radiation, radiation sensitive means for generating electrical signals in response to radiation applied thereto, means for directing radiation from said flame generating means to said radiation sensitive means, means for receiving radiation from said flame generating means and retrodirecting the radiation back through said flame generating means to said radiation sensitive means, means for modulating at least the radiation retrodirected through said flame generating means, and circuit means coupled to said radiation sensitive means, said circuit means being responsive to said electrical signals generated by said radiation sensitive means to provide a signal corresponding to the amount of retrodirected radiation transmitted through said flame generating means.

3. Photometric apparatus for analyzing an element in a material comprising first means for exciting said material so that said material emits and absorbs radiation of at least one spectral line, radiation sensitive means for generating an electrical signal in response to radiation applied thereto positioned to receive radiation emitted from said material, second means receiving radiation emitted from said material and redirecting said radiation through said first means to said radiation sensitive means, and circuit means coupled to said radiation sensitive means for comparing the electrical signals corresponding to radiation emitted by said material and radiation retrodirected through said first means and for providing a signal corresponding to the amount of retrodirected radiation absorbed by said first means.

4. Photoelectric apparatus for analyzing an element in a material comprising first means producing an atomic vapor emitting radiation having an atomic spectral line character of said element, a photosensor responsive to radiation applied thereto for regenerating an electrical signal corresponding to the amount of radiation received, second means for periodically directing radiation from said first means to said photosensor, third means receiving radiation from said first means for periodically redirecting the received radiation back through the first means to said photosensor, and circuit means coupled to said photosensor and being responsive to the electrical signal generated by said photosensor for developing a signal corresponding to the amount of radiation transmitted through said first means.

5. Photoelectric apparatus for analyzing an element in a material comprising flame generating means for receiving said material, radiation sensitive means for generating an electrical signal in response to radiation applied thereto, means for directing radiation from said flame generating means to said radiation sensitive means, means for retrodirecting radiation received from said flame generating means back through said flame generating means to said radiation sensitive means, chopper means for periodically interrupting the radiation retrodirected back through said flame generating means, first circuit means coupled to said radiation sensitive means for generating a signal corresponding to the intensity of radiation generated by said flame generating means, second circuit means coupled to said radiation sensitive means for generating a signal corresponding to the intensity of radiation retrodirected through said flame generating means, and third circuit means coupled to said first and second circuit means for generating a signal corresponding to the amount of radiation transmitted through said flame generating means.

6. Photoelectric apparatus for analyzing a substance in a material comprising first means for exciting said material so that said material emits and absorbs radiation having an atomic spectral line characteristic of said substance, first and second photosensors for generating electrical signals corresponding to the amount of radiation applied thereto, means for directing radiation from said first means to said first photosensor, means receiving radiation from said first means for redirecting the radiation back through said first means to said second photosensor, first circuit means coupled to said first photosensor for generating a signal corresponding to the amount of radiation emitted by said first means, second circuit means coupled to said second photosensor for generating a signal corresponding to the amount of retrodirected radiation transmitted through said first means, and third circuit means coupled to said first and second circuit means providing an indication corresponding to the amount of redirected radiation absorbed by said first means.

7. Photoelectric apparatus for analyzing a substance in a material comprising first means for exciting said material so that said material emits and absorbs radiation having an atomic spectral line characteristic of said substance, radiation sensitive means for generating electrical signals corresponding to the amount of radiation received, means for directing a beam of radiation from said first means to said radiation sensitive means, means for receiving radiation from said first means and redirecting a beam of radiation through said first means for absorbance by said material to said radiation sensitive means, means for modulating at least one of said beams, and circuit means coupled to said radiation sensitive means for comparing the electrical signals corresponding to radiation received from said material and radiation retrodirected through said first means and for generating a signal corresponding to the amount of redirected radiation absorbed by said first means.

References Cited

UNITED STATES PATENTS 2,847,899  8/1958  Walsh _____ 88—14

JEWELL H. PEDERSEN, *Primary Examiner.*

F. L. EVANS, *Assistant Examiner.*